Sept. 22, 1931.  J. M. DAPRON  1,824,036
BRAKE VALVE DEVICE
Filed June 3, 1929
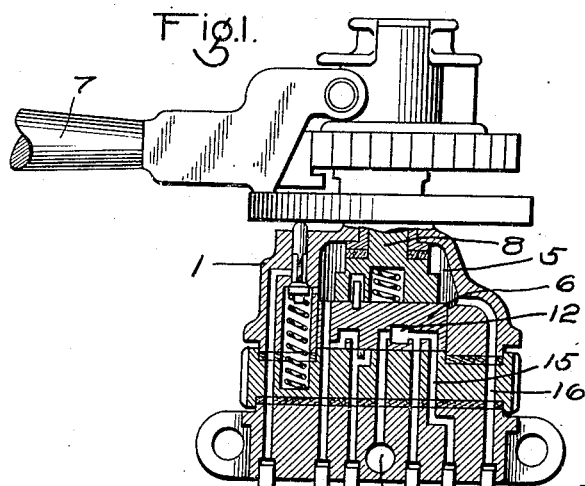
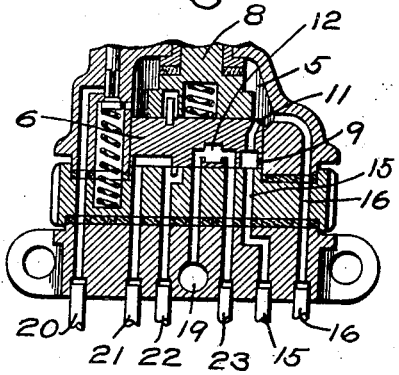
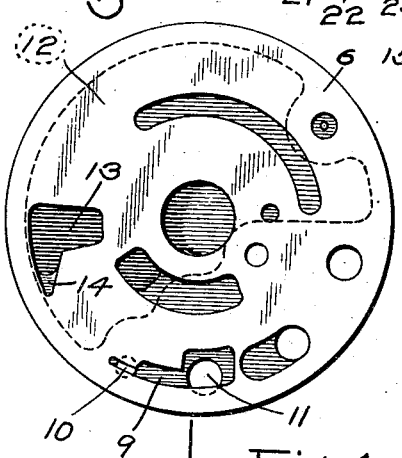
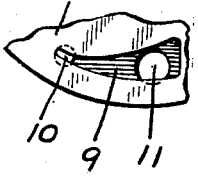
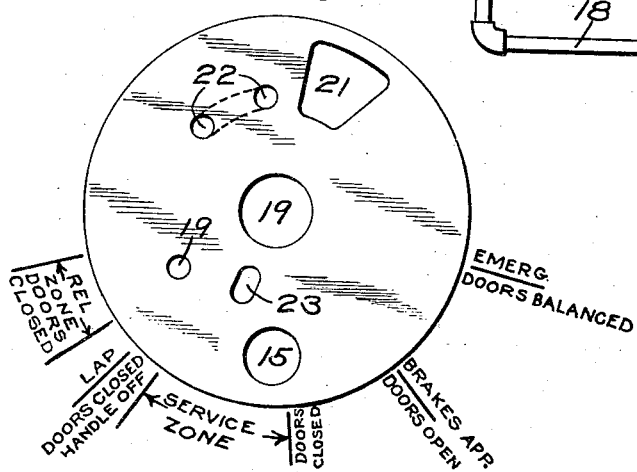
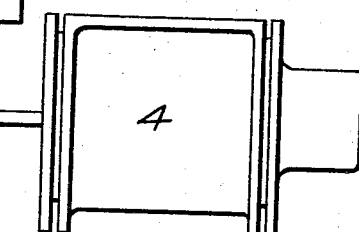
INVENTOR
JOSEPH M. DAPRON
BY
*Wm. M. Cady*
ATTORNEY Patented Sept. 22, 1931

1,824,036

UNITED STATES PATENT OFFICE

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA

BRAKE VALVE DEVICE

Application filed June 3, 1929. Serial No. 367,955.

This invention relates to fluid pressure brake equipments and more particularly to the brake valve devices for use with such equipments.

The principal object of my invention is to provide an improved brake valve device by which the flow of fluid therethrough, in applying and releasing the brakes, may be so controlled as to effect the gradual application and release of the brakes.

In the accompanying drawings, Figure 1 is a diagrammatic view, partly in section, of a portion of a fluid pressure brake equipment embodying my invention, the brake valve device being shown in release position; Fig. 2 is a fragmental diagrammatic sectional view showing the brake valve device in service position; Fig. 3 is a plan view of the face of the rotary valve of the brake valve device; Fig. 4 is a plan view of the rotary valve seat, and Fig. 5 is a plan view of a portion of the face of the rotary valve showing a modification of the service cavity therein.

As shown in the accompanying drawings my improved brake valve device has been illustrated in combination with a fluid pressure brake equipment comprising a main reservoir 2, an emergency valve device 3 and a brake cylinder 4, but it is to be understood that this equipment is merely illustrative and that my brake valve device may be used with other types of equipments.

The brake valve device 1 may comprise a casing having a chamber 5 containing a rotary valve 6 which is adapted to be operated through the medium of a handle 7 and a stem or shaft 8 rotatably mounted in the casing.

The face of the rotary valve 6 is provided with a service cavity 9 which is of considerable length and extends in a direction around the rotary valve. This cavity varies in width from its narrowest portion at one end to its widest portion at its other end. Leading from the back of the rotary valve into the narrowest portion of the cavity is a service port 10 of small diameter and leading into the widest portion of the cavity is a service port 11 having a diameter considerably greater than that of the port 10. In Fig. 3 the width of the cavity is varied in three distinct stages, but it will be understood that the width may be gradually varied as shown in Fig. 5.

Leading from the face of the rotary valve 6 to a chamber 12, formed in the rotary valve, is a release port 13, which differs from the usual release port in that it is elongated at 14, which elongation is of varying width.

In operation, when it is desired to effect a full service application of the brakes, the brake valve device 1 is operated to full service position in which the widest portion of the service cavity 9, in the rotary valve 6, registers with the straight air passage 15, so that fluid under pressure in the valve chamber 5, as supplied from the main reservoir 2 through a pipe and passage 16, is supplied to the brake cylinder 4 at a fast rate, by way of the ports 10 and 11 in the rotary valve, cavity 9, straight air passages and pipe 15, a cavity 17 in the slide valve of the emergency valve device 3 and a passage and pipe 18.

Should it be desired to gradually effect the application of the brakes, the brake valve device is operated to the first service position in which fluid under pressure is supplied to the brake cylinder at a slow rate, through the ports 10 and 11 in the rotary valve and the narrowest portion of the cavity 9, the flow area of such portion governing the rate at which the brake cylinder pressure is built up. It has been found that by providing the port 10 in addition to the port 11, a more constant flow of fluid to the brake cylinder is obtained than if the fluid were supplied through the larger port 11 only and then through the cavity 9. Should it be desired to increase the rate of flow of fluid under pressure to the brake cylinder, the brake valve device is operated further toward full service position which causes a wider portion of the cavity 9 to register with the passage 15 and consequently permits fluid to flow to the brake cylinder at a faster rate.

If it should be desired to release the brakes gradually the brake device is operated to the first release position in which the narrowest end of the release cavity registers with the straight air passage 15, thus providing for a slow release of fluid under pressure from the brake cylinder to the atmosphere by way of the chamber 12 in the rotary valve and a passage 19. To increase the rate of the flow of fluid from the brake cylinder, the brake valve device is operated further toward release position thus increasing the flow area through the rotary valve. When the brake valve device is operated to full release position, the rotary valve does not in any way restrict the flow of fluid from the brake cylinder and such flow will be at a fast rate.

It will be noted from the foregoing description that with my improved brake valve device an operator may graduate the application and release of the brakes with a great deal more accuracy than has been possible with the use of the usual brake valve devices, which results in a more gentle handling of the car.

In the drawings there is shown a sanding pipe 20, an emergency pipe 21, a door closing pipe 22 and a door opening pipe 23, but since these pipes and their connections are well known and do not enter into the invention as set forth in the appended claims, a detailed description thereof is deemed unnecessary.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake valve device comprising a casing having a seat for a rotary valve, of a rotary valve in said casing having a cavity which varies in width throughout its length and through which fluid under pressure flows to effect an applicaiton of the brakes, and having two ports through which fluid under pressure is supplied to said cavity, one of said ports leading into said cavity at its narrowest portion and the other leading into the cavity at a wider portion, said rotary valve and valve seat cooperating to vary the rate of the flow of fluid from said cavity as said rotary valve is operated to effect an application of the brakes.

2. In a fluid pressure brake, the combination with a brake valve device comprising a casing having a seat for a rotary valve, of a rotary valve in said casing having a cavity which varies in with throughout its length and through which fluid under pressure flows to effect an application of the brakes, and having two ports through which fluid under pressure is supplied to said cavity, one of said ports leading into said cavity at its narrowest end and the other into the cavity at its widest end, said rotary valve and seat cooperating to vary the rate of the flow of fluid from said cavity according to the position of the rotary valve in effecting an application of the brakes.

In testimony whereof I have hereunto set my hand, this 28th day of May, 1929.

JOSEPH M. DAPRON.